(12) United States Patent
Morris et al.

(10) Patent No.: US 9,069,498 B2
(45) Date of Patent: Jun. 30, 2015

(54) PRESENTING DEVICES AS APPLICATIONS

(75) Inventors: Max Glenn Morris, Seattle, WA (US); Darren R. Davis, Woodinville, WA (US); Frank Gorgenyi, Bremerton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 443 days.

(21) Appl. No.: 13/230,393

(22) Filed: Sep. 12, 2011

(65) Prior Publication Data

US 2013/0063767 A1 Mar. 14, 2013

(51) Int. Cl.
*G06F 3/12* (2006.01)
*H04N 1/60* (2006.01)
*H04N 1/40* (2006.01)

(52) U.S. Cl.
CPC ............ *G06F 3/1206* (2013.01); *G06F 3/1284* (2013.01); *G06F 3/1247* (2013.01); *G06F 3/1224* (2013.01)

(58) Field of Classification Search
None
See application file for complete search history.

(56) References Cited

U.S. PATENT DOCUMENTS

| | | | |
|---|---|---|---|
| 5,862,377 | A | 1/1999 | Lee |
| 5,956,036 | A | 9/1999 | Glaser et al. |
| 6,097,499 | A | 8/2000 | Casey et al. |
| 6,943,905 | B2 | 9/2005 | Ferlitsch |
| 6,961,135 | B1 | 11/2005 | Nakagiri et al. |
| 7,111,279 | B2 | 9/2006 | Gazdik et al. |
| 7,284,203 | B1 | 10/2007 | Meeks et al. |
| 7,483,166 | B2 | 1/2009 | Kadoi et al. |
| 7,665,028 | B2 | 2/2010 | Cummins et al. |
| 2002/0093681 | A1 | 7/2002 | Hitaka |
| 2003/0014529 | A1 | 1/2003 | Simpson et al. |
| 2003/0117638 | A1 | 6/2003 | Ferlitsch |
| 2004/0193621 | A1 | 9/2004 | Moore et al. |
| 2005/0086309 | A1 | 4/2005 | Galli et al. |

(Continued)

FOREIGN PATENT DOCUMENTS

| | | |
|---|---|---|
| CN | 1347531 | 5/2002 |
| WO | WO0049547 A1 | 8/2000 |
| WO | 2010053622 | 5/2010 |

OTHER PUBLICATIONS

PCT Intl Search Report and Written Opinion dated Sept 3, 2012 for PCT appln No. PCT/US2011/065703, 10 pgs.

(Continued)

*Primary Examiner* — Thomas Lett
(74) *Attorney, Agent, or Firm* — John Jardine; Kate Drakos; Micky Minhas

(57) ABSTRACT

One or more management components mediate a bi-directional interaction between applications. The components mediate interaction between a first application such as a word processing, video conference, or multimedia application, and a second application that is a virtualization of a physical device such as a printer, camera, or multimedia device. Further, embodiments also support a second application that provides an interface to a service provider, online business, and the like. The management component(s) may function as part of an operating system (OS), allowing the OS to mediate the interaction, and enable greater flexibility and a richer user experience, including presenting a common user experience for the interaction and/or acting as a broker to present a experience generated from the second application. Embodiments also include a unified application programming interface (API) to allow applications to interact with each other via the management component(s) of the OS.

20 Claims, 13 Drawing Sheets

(56) References Cited

U.S. PATENT DOCUMENTS

| | | | |
|---|---|---|---|
| 2005/0108456 A1 | 5/2005 | Boutcher et al. | |
| 2005/0235051 A1 | 10/2005 | Brown et al. | |
| 2005/0246588 A1 | 11/2005 | Deng et al. | |
| 2006/0206587 A1 | 9/2006 | Fabbrocino | |
| 2007/0067726 A1 | 3/2007 | Flynt et al. | |
| 2007/0157104 A1 | 7/2007 | Blain et al. | |
| 2008/0027909 A1 | 1/2008 | Gang et al. | |
| 2008/0028283 A1* | 1/2008 | Iwasaki | 715/200 |
| 2008/0077867 A1 | 3/2008 | Hake et al. | |
| 2008/0098327 A1 | 4/2008 | Berkovitz et al. | |
| 2008/0165379 A1* | 7/2008 | Zuber | 358/1.9 |
| 2009/0037517 A1 | 2/2009 | Frei | |
| 2009/0157741 A1 | 6/2009 | Cheng et al. | |
| 2009/0168100 A1 | 7/2009 | Huster | |
| 2009/0234876 A1 | 9/2009 | Schigel et al. | |
| 2010/0049788 A1 | 2/2010 | Bandaru et al. | |
| 2010/0077336 A1 | 3/2010 | Ording et al. | |

OTHER PUBLICATIONS

"Using Common Dialog Boxes", Retrieved on Sep. 7, 2011 at http://msdn.microsoft.com/en-us/library/ms646829%28v=vs.85%29.aspx#print_dlg, 8 pgs.

Williams, "Using SoftBench to Integrate Heterogeneous Software Development Environments", Hewlett Packard Journal, retrieved from http://www.hpl.hp,com/hpjournal/97feb/feb97a5.pdf, Feb. 1997, 7 pgs.

Chinese Office Action mailed Nov. 2, 2014 for Chinese patent application No. 201210335882.8, a counterpart foreign application of U.S. Appl. No. 13/230,393, 12 pages.

PCT International Search Report and the Written Opinion for Application No. PCT/US/2011/055811, mailed on Sep. 28, 2012, 9 pgs.

The Extended European Search Report mailed Apr. 29, 2015 for European Patent Application No. 11872465.7, 6 pages.

* cited by examiner

PRESENTING DEVICES AS APPLICATIONS

BACKGROUND

From the vantage point of most users, an application's interaction with a device is simple. For example, when a user of a word processing program wants to print a document, the user simply presses a button (or interacts with a dialog) then picks up the printed sheet of paper at the printer. However, behind the scenes at the software and hardware levels, this process may involve a complex integration of several system services resulting in the printed sheet waiting in the printer tray. This complexity creates, in many cases, a close binding that may inhibit flexibility in the interaction between applications and devices.

Devices are typically represented to a computing device via a device driver. A device driver is a strongly typed component which enables applications and/or system services to interact directly with a device that is associated with the driver. A typical device driver is primarily responsible for enabling communication between the host computing device and the device to which it is attached. This communication may be via a direct link on the circuit board associated with a specific pin on the central processing unit (CPU), via a generalized expansion bus such as Peripheral Component Interconnect (PCI), Inter-Integrated Circuit (I2C), or Universal Serial Bus (USB), or via a network medium such as Ethernet. Communication over this link involves both command and control as well as data exchange. The device driver provides either a normalized (e.g., system defined) view of a particular device, such that the driver represents a class of devices, or a specialized implementation for the particular device in question.

For example, traditional printing from an application may proceed as depicted in FIG. 1. As shown, process 100 begins at block 102 with a user indicating to an application (e.g. a word processing application, image editor, spreadsheet program, and the like) that a document is to be printed at a particular printing device. At block 104, the application loads the particular device context for the requested printer. The device context is often a system provided abstraction of the actual device and enables interaction between the application, system services, and the printer device driver for the purpose of creating printed output. Based on information provided in the device context, the application determines one or more settings and/or options available for printing to the particular printing device. At block 106, the application creates a formalized description of a fixed page layout for each page of the document to be printed, based on the settings and/or options specified by the user. In some cases, instead of creating a fixed page layout, each page is drawn on (e.g., as in many ink jet printers). At block 108, the application submits the formalized description for each page via the device context, which results in either spooling the formalized page description(s) directly to the printer or submitting them via a print server. In this example, the application creates the print layout and then interacts directly with the device via the device context to directly negotiate a format for the output. The device context then passes the output to a printing subsystem which then prints. Thus, the application interacts more or less directly with the printer or other type of device, creating a close binding between application and device.

SUMMARY

This disclosure presents a new paradigm for interaction between applications and devices. As described below, one or more management components manage and mediate a bi-directional interaction between applications. This enables interaction between a first application and a second application that is a virtualization of a physical device (e.g., a printer, a webcam, a video display, or other device) or that provides an interface to a service provider, online business, and the like. In this way, devices may be treated as services that interface with another application. For example, in those cases where the second application is a virtualization of a physical printer device, the second application serves as a representation of a printing service rather than the physical printing device, so that the functionality of the device is virtualized into a service contract.

The management component(s) may function as part of an operating system (OS), allowing the OS to broker the bi-directional, application-to-application interaction and enable greater flexibility in the interaction. Some embodiments include an application programming interface (API) to allow applications to interact with each other via the management component(s) of the OS. In the paradigm represented by embodiments described herein, greater importance is placed on data exchange that is mediated by user interaction in the context of both applications, instead of command and control. This is in contrast to the traditional device driver model, which supports limited mediation by the user and where command and control represents a more significant portion of the overall driver design.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
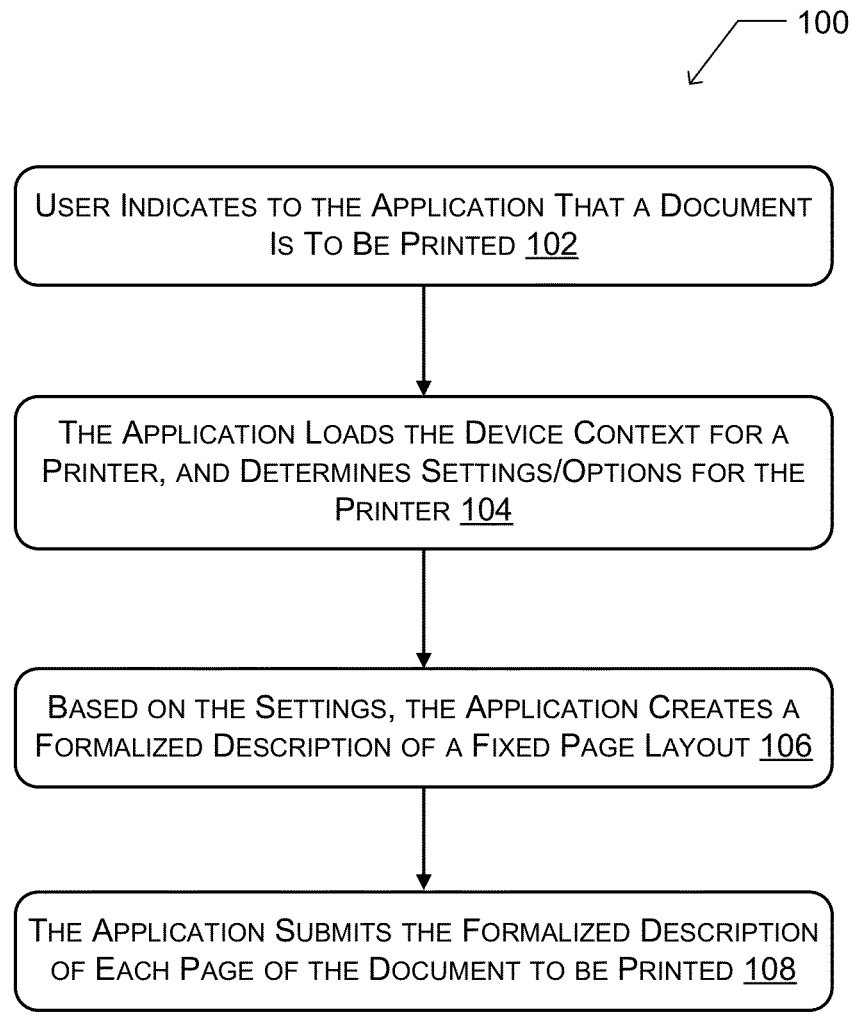
FIG. 1 depicts a traditional process for printing a document from an application.

Briefly described, embodiments are directed to a management component (or management application) that mediates an interaction between applications. Through this mediation, one application creates an output that is consumed and/or processed by another application. The management component brokers this interaction and manages the user experience associated with the interaction. In some embodiments, the management component may mediate a bi-directional interaction between a first application (e.g., a user application such as a word processing application, or other application) and a second application. The second application may be a virtualization of a device (e.g., a peripheral device such as a printer), or the second application may be an interface or a front end to a service provider (e.g., an online print services business).

As used herein, experience and user experience refer to one or more dialogs, displays, windows, controls presented to a user to gather information from and/or present information to the user, and the flow, arrangement, and/or timing of their presentation. Although the term dialog may be used herein, it should be appreciated that this term is used for the sake of clarity of description and should be construed as describing a broad experience not limited to an individual dialog.

As used herein, virtualization describes a process in which an application simulates, imitates, or impersonates a hardware device to other hardware or software components, such that the interaction between the device and another component occurs via the application. Unlike traditional device driver designs in which the communication focus is often on command and control of the device, the virtualization described herein gives greater focus to the intent of the operation and the data exchanged in the process. This different focus may be illustrated using the printing scenario as an example. Whereas traditional printing drivers focus on how to talk to a printer to instruct it to print content on a page, the virtualization described herein focuses on the operation of printing itself and the implementation of how the printing is accomplished is left to the virtualizing application. Although this virtualization may include a device driver, it may also include virtualized applications that provide richer functionality than a device driver.

In some embodiments, the management component is part of an OS running on a client device. Further, some embodiments include a management API that allows a first application (e.g., a user application such as a word processing application) to interface with the management component to enable the bi-directional interaction between the first application and a second application that is a virtualization of a device or a front end to an online service.

Because the interaction is bi-directional, the first user application may either generate content that is consumed by the second application, or may consume content that is generated by the second application. An example of the first scenario is a word processing application (e.g., Microsoft® Word™, Corel™ WordPerfect®, and the like) generating a document to be printed by a printer device or submitted as a print job to an online print services provider. In this example, the second application acts as a virtualization of the printer device or as a front end/interface to the print services provider. An example of the second scenario is a online video conference or chat program (e.g., Skype™, Windows Live™ Messenger, Yahoo!® Messenger, and the like) consuming an audio/video content stream produced by a webcam or other camera device. In this example, the second application acts as a virtualization of the camera device. Both of these scenarios are described in greater detail below.

Moreover, although the examples listed herein describe a bi-directional interaction, embodiments are not so limited. Because the management component and associated API creates a common framework for applications (including virtual device applications) to communicate with one another, embodiments support a flexible paradigm in which multi-directional communication is enabled between any number of applications and devices. For example, in some embodiments the first user application may act as both a creator of content to be sent to a second application, and a consumer of other content received from a third application, where each pair-wise interaction between applications is mediated by the management component of the OS.

Embodiments described herein allow the management component to mediate the interaction between two applications, and provide greater flexibility for the applications to interact with one another. This increased flexibility may be illustrated using print functionality as an example. Traditionally, a word processing application creates a print layout for a document, and then interacts with a printer device context to directly negotiate with that device an output format for the document. The device context then passes the print layout to the print subsystem which prints the document at the printer. Thus, delivery of the document in the output print layout is performed by the application directly to the printer device via the device context. Given the traditional binding between device context and device driver this results in a specific set of commands being sent to the printer in some page definition language (e.g. PostScript or PCL) which the printer understands. These commands are directly converted into actions by the connected printer hardware.

Embodiments described herein differ from this traditional scenario in that the management component acts as an intermediary between a source application (e.g., the word processing application) and an application which virtualizes the concept of printing, using the printing scenario as an illustration. Instead of interacting directly with the printer device, the source application interacts with the intermediary management component which then communicates with the virtualized application on behalf of the source application. Thus, the source application may operate without any direct interaction with the particular device driver for the printer device.

Because the management component is an intermediary between source application and virtualization application, in this exchange the source application may be provided with a somewhat more limited set of information regarding the features supported by the printing component than in the traditional printer context based model. For example the information provided may be limited to information such as the size of the targeted output (e.g., a letter size piece of paper), its orientation, and the resolution of the targeted output. These capabilities may be determined by the management component, as described further below. Thus, embodiments enable a shift from the traditional model of a direct command and control of the device by the application to a more encapsulated representation of the operation. In the example printing scenario, this results in an exchange of the printed content in the form of a higher level document exchange format such as OpenXPS or Adobe® Portable Document Format (PDF), instead of an exchange of discrete instructions on how the printer should manipulate the hardware to create the printed output.

In some embodiments, the management component enables virtualized applications to register their ability to participate in certain data exchange scenarios. For example, a virtualized application for printing may be enabled to inform the management component for printing that it is available to be used as a target for the printing functionality. Various models may be employed for registering virtualized applications with the management component for the purpose of serving as a target application in a managed data exchange.

Moreover, by moving the selection of the target for the operation outside of the source application and into the management component, greater flexibility is introduced into the overall system to adapt to new innovations or new capabilities of devices or services. For example, where the management component is part of an OS, new modalities for supporting different types of virtualized applications may be introduced over time through updates, without requiring changes to the source application. This differs from the traditional device driver model in which new modalities are supported through modification of the source application to add support for the specific, new modality.

Moreover, use of the management component as an intermediary provides for greater flexibility in the resulting user experience. For example, in some embodiments the management component may interrogate the printer device (e.g., through interaction with a virtual application impersonating the printer device) to determine its capabilities and the print options available. Further, the management component may present a common dialog to enable a user to select print options (e.g., paper size, pagination, multi-sided, color palette, and the like), and relieve the word processing application of that task. Similarly, the management component may also provide a user interface to allow the user to preview the document to be printed, and relieve the word processing application of that task as well.

In other embodiments the management component may delegate the responsibility for the user interface to the virtualized application. This provides significant benefit to the virtualized process as it is no longer bound by the traditional constraints of the device driver abstraction. In general, embodiments operate to abstract out the print functionality and user experience from the word processing application (or abstract out other device-related interaction), and separate format negotiation functionality from content flow. In this way, embodiments may enable the presentation of a richer user experience related to printing (or other types of application-to-device interaction).

Further, embodiments described herein facilitate the use of an application that acts as a front end and/or interface for an online service provider. Again using printing as an example, a user of a word processing application may select as a print target an application for a printing services provider. From the user's perspective, the user is selecting to print to a target, but instead the management component activates the virtualized application for the purpose of completing the print experience. In some cases, this virtualized application may present a different user experience compared to a physical printer device. For example, users may be required to provide some form of identification or authentication to manage payment or other auditing. Also the types of functionality available at the print service may be different than those available from a traditional printing device. Once the appropriate information is gathered, the management component may submit the document as part of a print job request to the printing services provider instead of sending a document to a printing device to be printed. The user may then proceed to the printing services provider's store to pick up the output printed document, published book, pamphlet, poster, or virtually any other format of publication. In this way, embodiments allow such a service provider to effectively impersonate a printing device to enable a user to more easily take advantage of their services, without requiring the overhead of creating a device driver.

Moreover, because the management component and API provide a unified user experience to allow a user application (e.g., a word processing application) to interact with devices (e.g., printers) or online service providers (e.g., online print shops), user application developers no longer have to write their application to support different classes of devices or various online service provider interfaces. The management component and unified API abstract that functionality away from the user application, creating a common, potentially more feature rich user experience.

In some embodiments, the management component also enables a richer ecosystem for supporting device-like behaviors via virtualized applications. For example, in the traditional device driver model the installation of the device driver is contingent upon the presence of the device. Device presence may be determined by a physical connection of the device directly to the host computer via one of the many common peripheral interconnect buses (e.g., PCI, I2C, USB, and the like) on which the management component is operating. Further, device presence may also be determined by the presence of the device on the network. In this traditional model, device presence is typically determined through one of many possible network device discovery protocols recognizable to those skilled in the art.

This traditional experience differs from the virtualized application model according to embodiments described herein. In cases where physical device hardware is not required, as in the example of a print service, discovery of the functionality may be facilitated through the installation of the virtualizing application. This application may be directly available from the service provider or from some form of application marketplace. In some embodiments, application lifetime management facilities available through marketplace environments offer greater flexibility to application developers, through simpler automatic update procedures, more flexible programming environments, and the like. These lifetime management facilities make it easier to deliver a particular scenario than in the traditional device driver model.

Illustrative Environment

Figure 2:
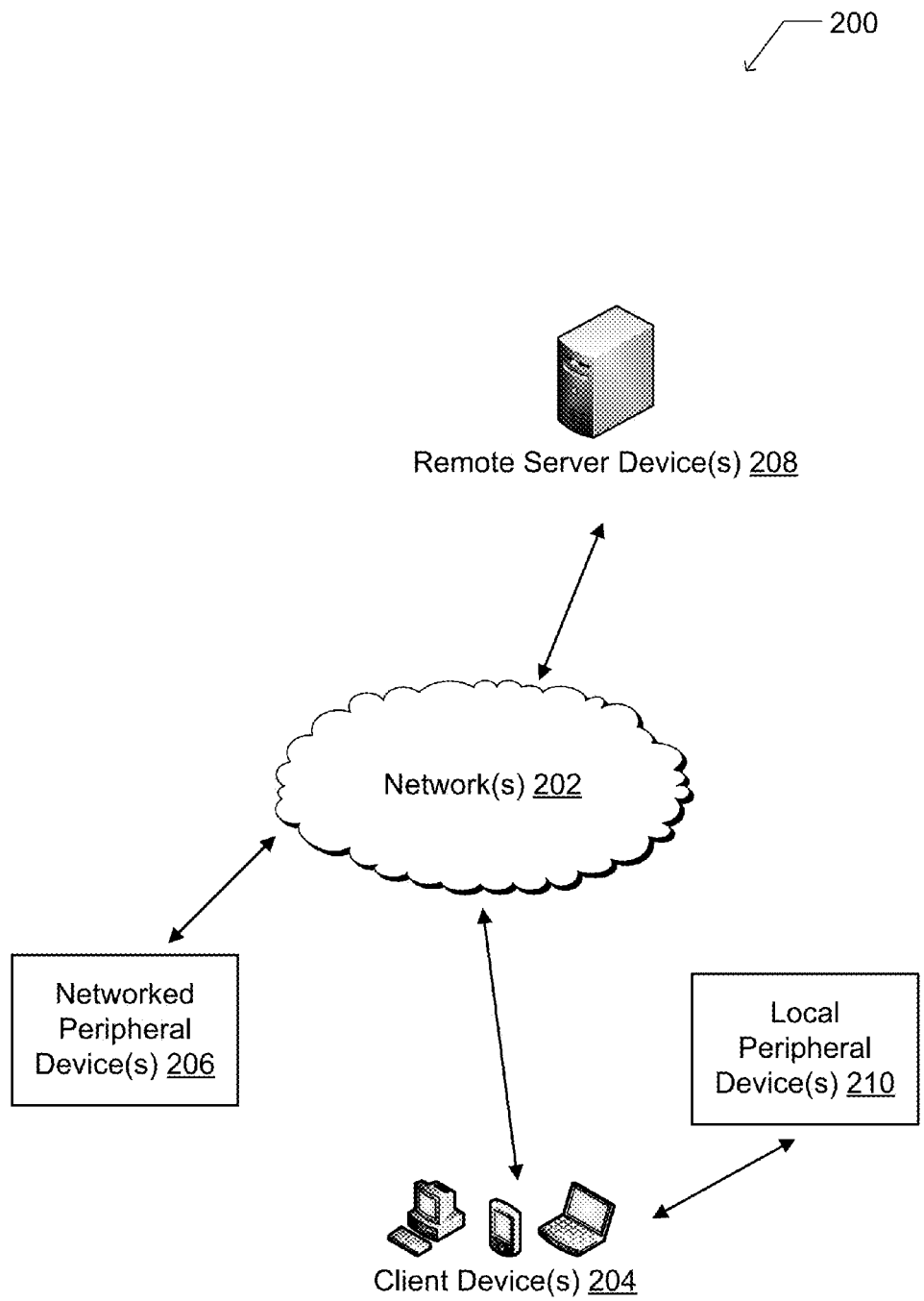
FIG. 2 is a schematic diagram depicting an example environment in which one or more embodiments may operate.

FIG. 2 depicts an example environment 200 in which embodiments operate. As shown, the various devices of environment 200 communicate with one another via one or more networks 202 that may include any type of networks that enable such communication. For example, networks 202 may include public networks such as the Internet, private networks such as an institutional and/or personal intranet, or some combination of private and public networks. Networks 202 may also include any type of wired and/or wireless network, including but not limited to local area networks (LANs), wide area networks (WANs), Wi-Fi™, WiMax™, and mobile communications networks (e.g. 3G, 4G, and so forth). Networks 202 may utilize communications protocols, including packet-based and/or datagram-based protocols such as internet protocol (IP), transmission control protocol (TCP), user datagram protocol (UDP), or other types of protocols. Moreover, networks 202 may also include a number of devices that facilitate network communications and/or form a hardware basis for the networks, such as switches, routers, gateways, access points, firewalls, base stations, repeaters, backbone devices, and the like.

Environment 200 further includes one or more client device(s) 204 associated with user(s). Briefly described, client device(s) 204 may include any type of computing device that a user may employ to send and receive information over networks 202. For example, client device(s) 204 may include, but are not limited to, desktop computers, laptop computers, pad computers, wearable computers, media players, automotive computers, mobile computing devices, smart phones, personal data assistants (PDAs), game consoles/platforms, mobile gaming devices, set-top boxes, and the like. Client device(s) 204 generally include one or more applications that enable a user to send and receive information over the web and/or internet, including but not limited to web browsers, e-mail client applications, chat or instant messaging (IM) clients, and other applications.

Client device(s) 204 may also include one or more applications for word processing, accounting, preparing presentations, multimedia processing (e.g., for processing video, audio, image, graphics, and the like), gaming, social networking, chat/instant messaging (IM), or other types of applications. Client device(s) 204 may run an OS that includes mediation and/or management components for mediating a bi-directional application-application interaction, as described further herein.

As shown in FIG. 2, environment 200 may also include one or more networked peripheral device(s) 206. Such devices may communicate over network(s) 202 to other devices such as client device(s) 204 and/or remote server device(s) 208 to provide functionality, including but not limited to printing, multimedia display, communications, and the like. As described further herein, such networked peripheral device(s) 206 may present an application that is a virtualization of the device. Such an application may call into the management API to enable bi-direction interaction with an application running on a client device 204.

Environment 200 may further include one or more remote server device(s) 208. In some embodiments, remote server device(s) 208 may include server device(s) that provide online services, commerce, and the like. Employing embodiments described herein, a remote server device may provide an interface in the form of an application that engages in bi-directional application-to-application communication with an application running on a client device, to allow a user to take advantage of an online service.

For example, a remote server device 206 may be managed by a printing services provider for printing documents, creating advertising/marketing materials, publishing manuscripts, and the like. Such a printing services provider may use an application that calls into the management API to enable bi-directional interaction with a word processing application running on a client device 204. In this way, a user running the word processing application may select a "Print" option from the application, and send a document as a print job to the printing services provider via management component(s) running as part of the OS of the client device. Thus, embodiments allow the printing services provider to make their services available to a user as conveniently as if the printing services provider was a printing device.

Server device(s) 208 may also represent application marketplace servers that facilitate the discovery, installation, and/or management of applications by users. In some embodiments, such marketplace servers facilitate the propagation of virtualized applications for supporting physical hardware devices as well as remote server applications for providing online services, e-business services, and the like.

Environment 200 may also include one or more local peripheral devices 210 directly connected to the client device(s) 204, via a computer bus such as PCI, I2C, USB, and the like, or through other connection models. Such local peripheral device(s) 210 may provide functionality, including but not limited to printing, multimedia display, communications, and the like. As described further herein, such local peripheral device(s) 210 may present an application that is a virtualization of the device. Such an application may call into the management API to enable bi-direction interaction with an application running on one or more client device(s) 204.

Although not explicitly depicted, environment 200 may further include one or more databases or other storage devices, configured to store data related to the various operations described herein. Such storage devices may be incorporated into one or more of the devices depicted, or may be external storage devices separate from but in communication with one or more of the devices. Stored data may also include information regarding the operations of client device(s) 204, networked peripheral device(s) 206, remote server device(s) 208, and/or local peripheral device(s) 210.

In general, each of the one or more of the devices depicted in FIG. 2 may include multiple computing devices arranged in a cluster, server farm, or other grouping to share workload. Such groups of devices may be load balanced or otherwise managed to provide more efficient operations. Moreover, although various computing devices of environment 200 are described as clients or servers, each device may operate in either capacity to perform operations related to various embodiments. Thus, the description of a device as a client or a server is provided for illustrative purposes, and does not limit the scope of activities that may be performed by the device.

Illustrative Computing Device Architecture

Figure 3:
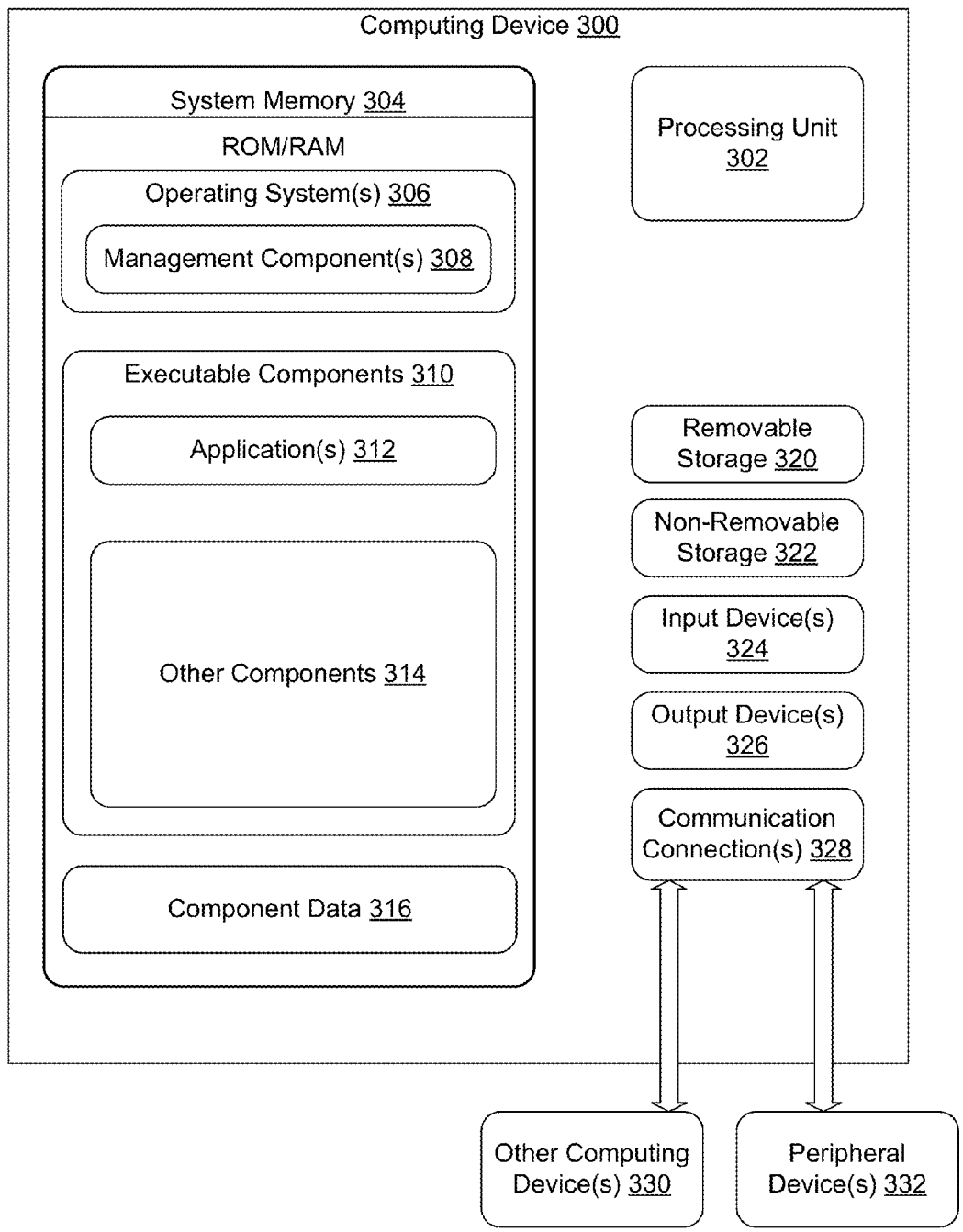
FIG. 3 is a diagram of an example computing device that may be deployed as part of the example environment of FIG. 2, for one or more embodiments.

FIG. 3 depicts a block diagram of an example computer system architecture for the various devices depicted in FIG. 2. As shown, computing device 300 includes processing unit 302. Processing unit 302 may include one or more processing units (e.g., processors), and may be implemented as hardware, software, or some combination thereof. As used herein, processor refers to a hardware component. Processing unit 302 may include computer-executable, processor-executable, and/or machine-executable instructions written in any suitable programming language to perform various functions described herein. In some embodiments, processing unit 302 may further include one or more graphics processing units (GPUs).

Computing device 300 further includes a system memory 304, which may include volatile memory such as random access memory (RAM), static random access memory (SRAM), dynamic random access memory (DRAM), and the like. System memory 304 may also include non-volatile memory such as read only memory (ROM), flash memory, and the like. System memory 304 may also include cache memory. As shown, system memory 304 includes one or more OS(s) 306, such as Windows®, Linux®, iOS®, and the like. As described further below, OS(s) 306 may also include one or more management component(s) 308 that operate to manage and/or mediate bi-directional interaction between applications and/or devices.

System memory 304 may also include one or more executable components 310, which may include programs, applications, and/or processes that are loadable and executable by processing unit(s) 302. These may include application(s) 312 for word processing, accounting, preparing presentations, multimedia processing (e.g., for processing video, audio, image, graphics, and the like), gaming, social networking, chat/instant messaging (IM), or other types of applications. Executable components 310 may also include other components 314. The various components, applications, OS(s) in system memory 304 may employ component data 316 as a storage area to store data related to their various functions.

As shown in FIG. 3, computing device 300 may also include removable storage 320 and/or non-removable storage 322, including but not limited to magnetic disk storage, optical disk storage, tape storage, and the like. Disk drives and associated computer-readable media may provide non-volatile storage of computer readable instructions, data structures, program modules, and other data for operation of computing device 300.

In general, computer-readable media includes computer storage media and communications media.

Computer storage media includes volatile and non-volatile, removable and non-removable media implemented in any method or technology for storage of information such as computer readable instructions, data structure, program modules, and other data. Computer storage media includes, but is not limited to, RAM, ROM, erasable programmable read-only memory (EEPROM), SRAM, DRAM, flash memory or other memory technology, compact disc read-only memory (CD-ROM), digital versatile disks (DVDs) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave or other transmission mechanism. As defined herein, computer storage media does not include communication media.

Computing device 300 may include input device(s) 324, including but not limited to a keyboard, a mouse, a pen, a voice input device, a touch input device, game controller, and the like. Computing device 300 may further include output device(s) 326 including but not limited to a display, a printer, audio speakers, a haptic output interface, and the like. Computing device 300 may further include communications connection(s) 328 that allow computing device 300 to communicate with other computing devices 330, including client device(s) 204, remote server device(s) 208, databases, networked peripheral device(s) 206, or other computing devices accessible over network(s) 202. Communications connection(s) 328 may include a network interface controller (NIC), network adapter, transceiver, and the like.

Communication connection(s) 328 may also enable communication with one or more peripheral device(s) 332 that are physically separate from computing device 300 but connected via network(s) 202 or via a serial, parallel, Universal Serial Bus™ (USB), High Definition Multimedia Interface™ (HDMI), Audio-Visual (AV), or other type of connection. Such peripheral devices may include local peripheral device(s) 210 and include devices such as a printer, display, external storage device, and the like.

Illustrative Operations

Figure 4:
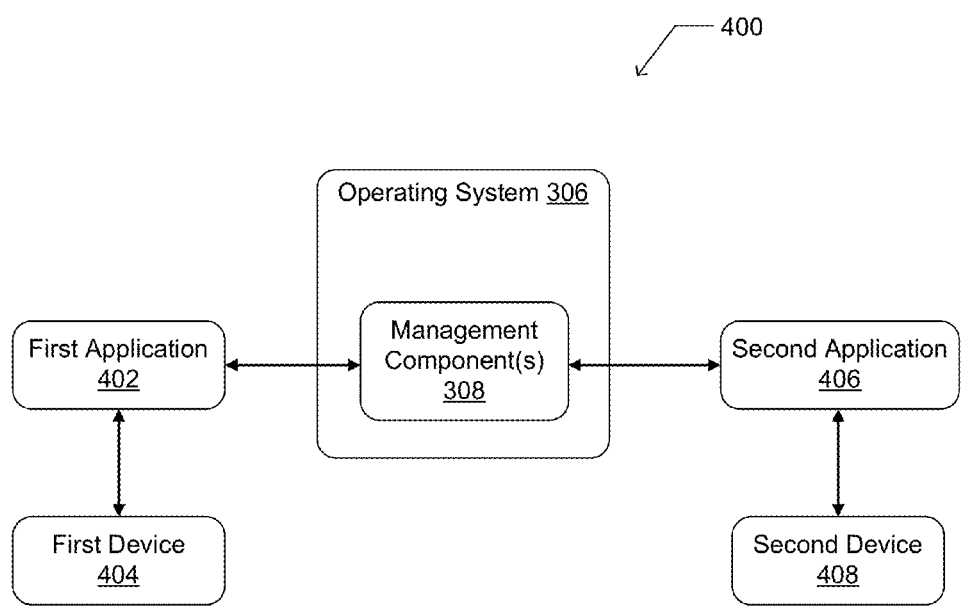
FIG. 4 is a diagram of an example configuration for mediating a bi-directional interaction between applications, for one or more embodiments.
Figure 6:
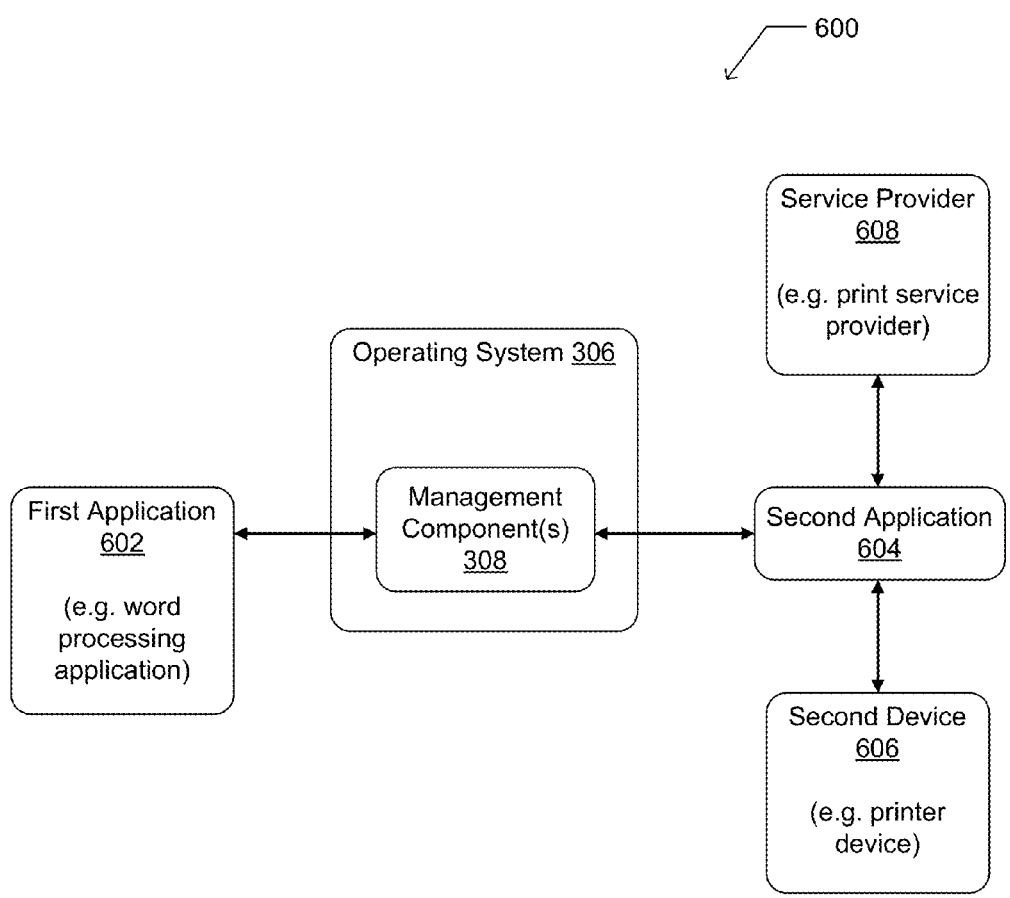
FIG. 6 is a diagram of an example configuration for mediating a bi-directional interaction between applications, for one or more embodiments.
Figure 8:
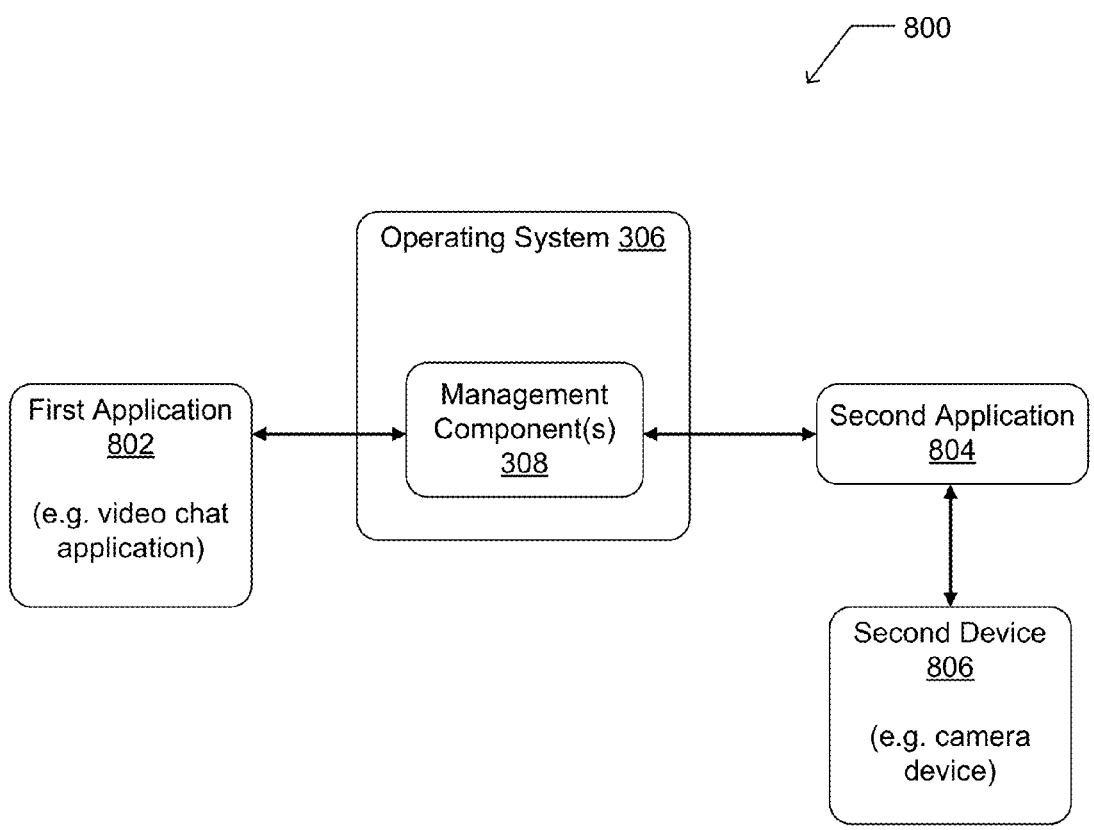
FIG. 8 is a diagram of an example configuration for mediating a bi-directional interaction between applications, for one or more embodiments.

FIGS. 4, 6, and 8 depict example configurations for management component(s) mediating interaction between applications and/or devices. The elements shown in these figures represent components, modules, processes, objects, and/or applications that may be implemented in hardware, software, or a combination thereof. The arrangements of elements shown are intended to be illustrative, and not limiting with regard to any order of operations, control flow, or particular location of elements. Thus, one or more of the elements shown may be components of a same device or of different devices. Further, although the figures depict bi-directional arrows, these arrows are meant to illustrate communication between various elements and such communication may be uni-directional and/or bi-directional under various circumstances.

FIG. 4 is a diagram of an example configuration for mediating a bi-directional interaction between applications. As shown in FIG. 4, OS 306 includes one or more management component(s) 308 for mediating an interaction between a first application 402 and a second application 406. In some embodiments, first application 402 may be a virtualization of a physical device such as first device 404. In this way, first application 402 may be effectively impersonating first device 404 with regard to management component(s) 308 and second application 406. Similarly, in some embodiments second application 406 may be a virtualization of a physical device such as second device 408, effectively impersonating second device 408. Management component(s) 308 mediate the interaction between first application 402 and second application 406, so that communications between the applications pass through and are managed by management component(s) 308. In some embodiments, first application 402 and/or second application 406 may be a virtualization of a device behavior that is bound to an external application server instead of a physical device.

Although first application 402 and/or second application 406 may be a user application executing on the same device (e.g. a client device) as OS 306, embodiments are not so limited. Virtually any arrangement of the elements of FIG. 4 is supported, such that various elements may be executing on different devices or the same device, given the exigencies of a particular scenario.

Further, some embodiments support a management API that exposes functionality, such as functions, methods, processes, interfaces, variables and the like. First application 402 and/or second application 406 may employ functionality of the management API to communicate with management component(s) 308.

In some embodiments, management component(s) 308 may provide a rich user experience through a common device dialog, by which a user may select among options for interacting with a particular device. These options may be determined by the management component(s) 308 interrogating a device through its associated virtualizing application to determine device capabilities and/or information that is required by the device. In alternate embodiments, management component(s) 308 might cause the user experience of the virtualized device application to be presented to the user for the purpose of allowing the user to configure and complete one or more options as required by the device. Such embodiments are described in greater detail with regard to FIGS. 6-9.

FIGS. 5A, 5B, 5C, 7A, 7B, 9A, and 9B depict flowcharts showing example processes in accordance with various embodiments. The operations of these processes are illustrated in individual blocks and summarized with reference to those blocks. The processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the process. Processes according to various embodiments may include some or all of the operations depicted in the logical flow graphs.

Figure 5A:
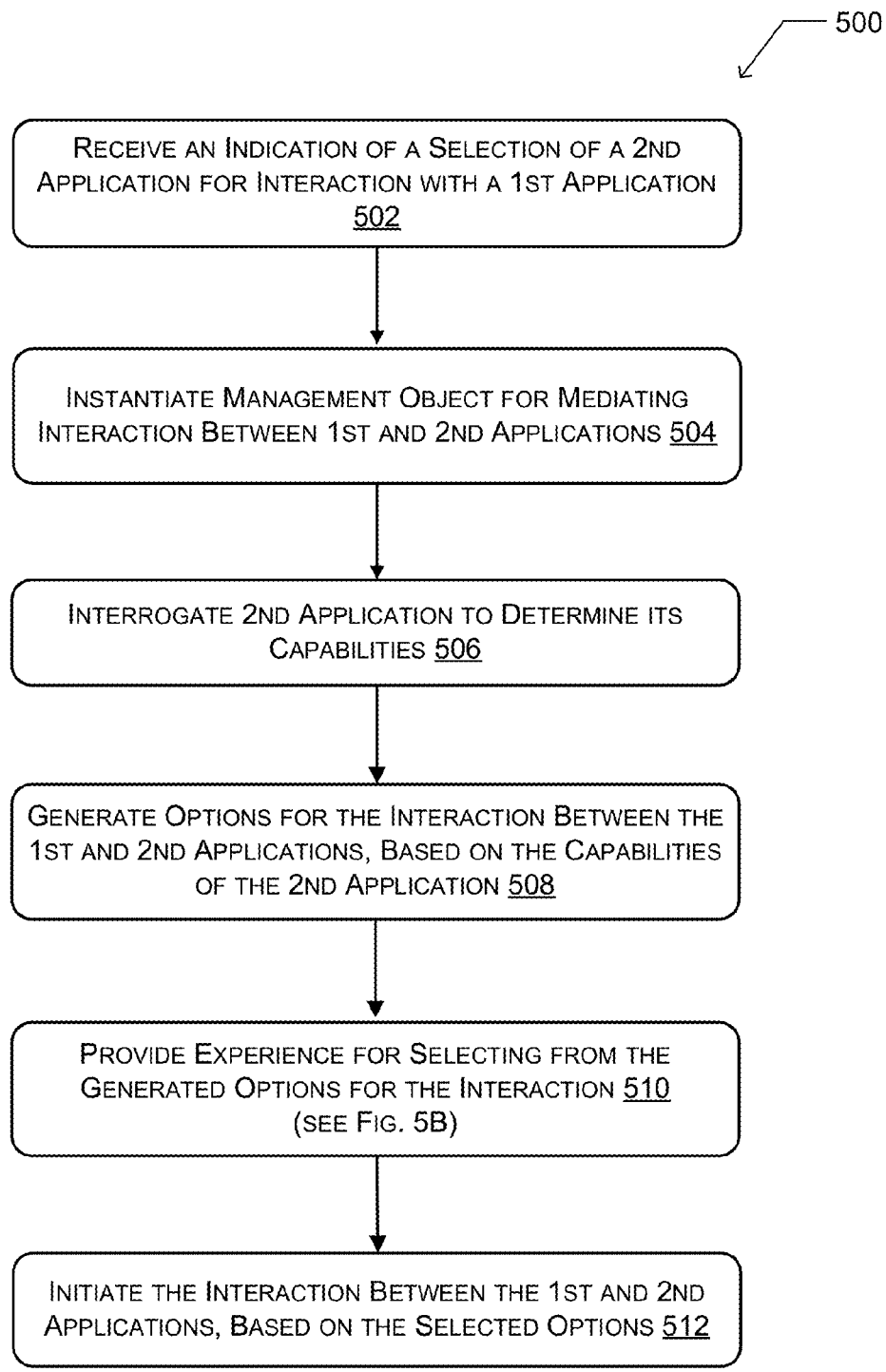
FIG. 5A depicts an illustrative process for mediating a bi-directional interaction between applications, for one or more embodiments.

FIG. 5A depicts an illustrative process 500 for mediating a bi-directional interaction between two applications. In some embodiments, process 500 executes as part of management component(s) 308. As shown in FIG. 4, one or both of the applications may be a virtualization of a physical device (e.g., a peripheral device such as a printer, camera, etc.) or a front end for an online service (e.g., a print service).

At block 502, an indication is received indicating the selection of a second application to interact with a first application. In some embodiments, the first application may be a user application (e.g., word processing application, video conferencing application, and the like) and the second application may be a virtualization of a target device such as a printer or a webcam, or a front end to an online service such as a printing service provider, that the user wishes the first application to interact with. The indication may be received as part of a communication packet, communicated from the first application to the management component according to a supported communications protocol. In some embodiments, the indication of the second application may be triggered by a user's selection, within a dialog of the first application or management component(s) 308, of a virtualized device and/or service to either consume data generated by the first application, or generate data to be consumed by the first application.

It is appreciated that some embodiments may include the registration of the virtualized application with the management component. This registration enables the informed determination of a second application by a user of the first application. For example, registration of the second application with the management component may enable either the management component or the first application to present to the user a list of possible targets for interaction with the first application. The user may then select the particular second application for the interaction. Registration and other aspects of the virtualized application lifetime management are described in greater detail with regard to FIG. 5C.

At block 504, a management object for mediating an interaction between the first and second applications may be instantiated. In some embodiments, the management object may be an executing instance of a management component that is implemented as a class, and the particular instance of the management object is created to mediate the particularly requested interaction between the first application and the second application. Because the management object is instantiated to mediate interaction with a particular application (e.g., the second application), the management object may be described as being bound to the second application.

In some embodiments, the particular instance of the management object exists as long as the first application is interacting with the second application. In some embodiments, the particular instance may be cached or otherwise saved and reused to handle subsequent interactions between the first and second applications, and/or subsequent interactions between another application and the second application. In some embodiments, the management object may be generic to a particular class of second applications (e.g., applications that are virtualizations of a particular type of device, such as a printer device).

At block 506, the management object may interrogate the second application to determine its capabilities. For example, where the second application is acting as a virtualization for a printer device, the management object may interrogate to determine print capabilities (e.g., two-sided printing, color palettes available, landscape vs. portrait layouts, page numbering, watermarking, etc.). At block 508, one or more options may be generated for the interaction between the first and second applications, based on the capabilities of the second application determined at block 506.

At block 510, the user may be provided with an experience by the management object. This experience may enable the user to select from among the one or more options determined at block 510. In some embodiments, the experience presented may be a common experience that is generic to a particular class of second application (e.g., those applications that are virtualizations of printer devices). In other embodiments, the experience may be specific to the particular second application and its capabilities. The provision of the experience is described in more detail below with regard to FIG. 5B.

At block 512, the bi-directional interaction between first and second applications may be initiated, based on those options selected by the user through the experience provided at block 510. In some embodiments, the interaction may be initiated following an additional step or steps (not shown) of the management object providing the user-selected options to the first and/or second applications. This provision may enable the first and/or second application to generate the particular data and/or content based on those options selected by the user. For example, in the print scenario, the user's selection of print options may be provided to the first application (e.g., a word processing application) which may then reflow and generate a formalized description of pages of the document to be printed, based on the options. This example is described in more detail with regard to FIGS. 6, 7A, and 7B.

Figure 5B:
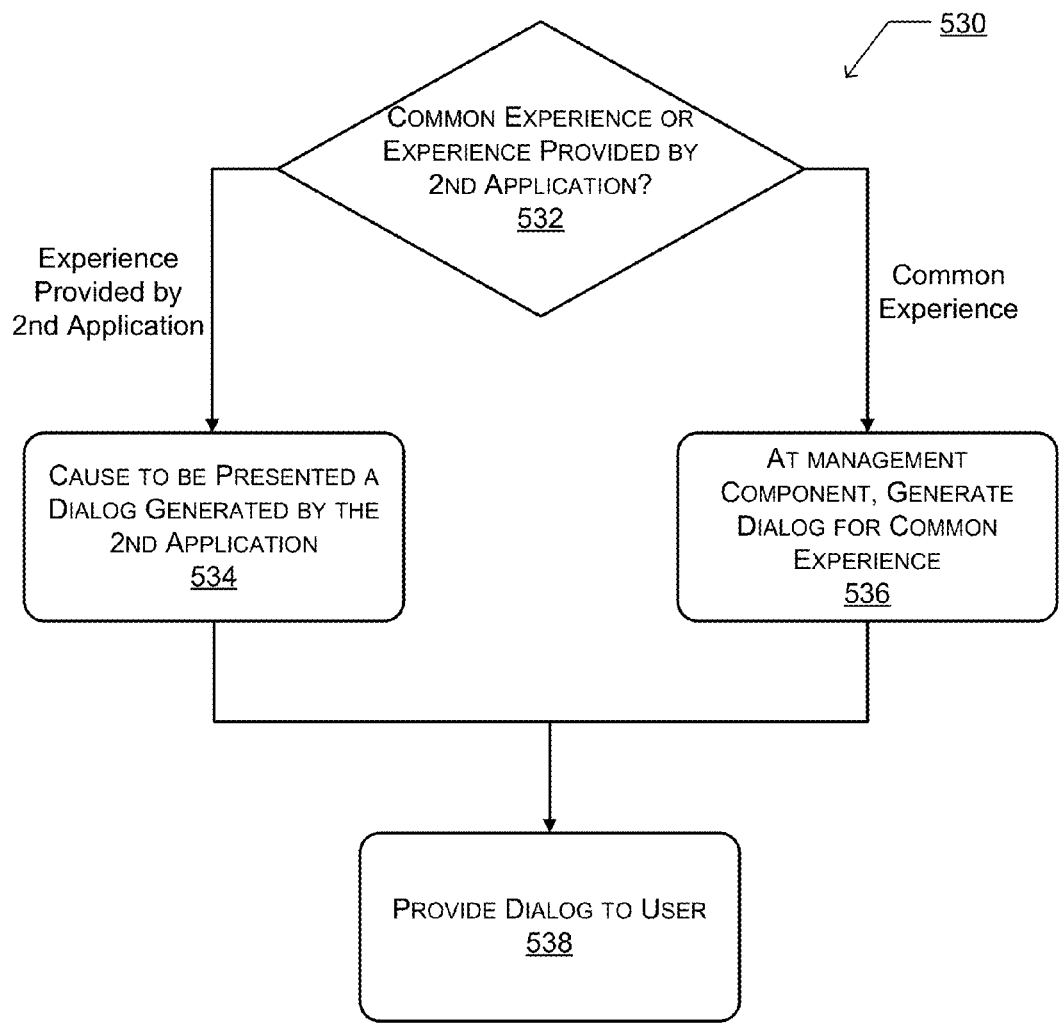
FIG. 5B depicts an illustrative process for providing a user experience in the context of a bi-directional interaction between application, for one or more embodiments.

FIG. 5B depicts an illustrative process 530 for providing a user experience in the context of a bi-directional interaction between application, for one or more embodiments. In some embodiments, providing the user experience may be part of process 500 for mediating a bi-directional interaction between applications, and may include providing a dialog as described with regard to step 510 of FIG. 5A.

At step 532, a decision is made whether to provide a common experience (e.g., a common dialog) to the user, or to provide an experience generated by and originating from the second application which represents either a virtualization of a physical device or a front end for an online service provider. In some embodiments, this determination may be based on information provided by the second application when it registers with the management component (as described with regard to FIG. 5C). For example, during registration the second application may specify to the management component that the management component is to provide a common dialog as part of its mediation of the interaction between the first and second applications. Alternatively, the second application may specify that the management component is to provide a dialog that is specific to and/or generated from the second application, and that includes options and/or requirements that are specific to the second application.

In an alternate embodiment, the management component may automatically determine whether to employ a common dialog or use a dialog provided by the second application. In some scenarios, the management component may decide to always use a common dialog for interaction with the second application. In other cases, the management component may determine to always use a dialog provided by the virtualized application. Moreover, in some cases the management component may decide which dialog to show depending on the specific context of the bi-directional communication being completed. In one non-limiting example for completing a bi-directional printing communication, management component may determine that all virtualized printer devices may use a common dialog while all virtualized printer services may present their own user experience.

If the decision is made to provide an experience at least partially specific to or tailored to the second application, process 530 proceeds to block 534 where the management component causes to be presented a dialog generated by the second application. In this case, the management component presents an experience provided by the second application, and thus serves as an intermediary that brokers the movement of configuration information between the first and second applications. It is appreciated that various models may be employed for the management component to cause a user experience to be presented by the second application. In one non-limiting example, the management component may provide a hosting model in which the second application is enabled to present its user experience. In another non-limiting example, the management component may receive a declarative description of the user experience from the second application and present the user experience completely on behalf of the second application. It should be noted that in some embodiments this scenario may allow for a management component with a less complex implementation, given that the management component is acting as a conduit to present the user experience generated by the second application, rather than managing particular capabilities of the dialog, and the like.

Alternatively, if the decision is made to provide a common experience, process 530 proceeds to block 536 where the management component generates a dialog for the common experience. In some embodiments, the dialog for the common experience may be common to a class of applications that includes the second application. For example, where the second application is a virtualization of a printer device, the common dialog may be common to virtualized applications for a class of printer devices. Such a class may include all devices in a class (e.g., all printer devices), or some subset such as devices with a particular manufacturer, devices that employ a particular technology (e.g., laser printers or inkjet printers), devices that support particular functionality (e.g., color palette, black-and-white, multisided print, particular print resolutions, and the like), or other classifications.

It is appreciated that in some embodiments the common dialog model may be viewed as a specialization of the model in which the management component enables presentation of the user experience of the second application for the purpose of dealing with a class of well-known devices. In such embodiments, providing a common dialog may be accomplished through the installation of another virtualized application which provides the common experience for a class of well-known devices. For example, a management component for a bi-directional printing experience may be configured to show an experience from a second application. In the event that a common class of experience is required, for example to present functionality for the class of all printer devices, the management component may automatically select and use a pre-installed application known directly to the management component for this purpose. In this manner, the management component is still enabled to provide for a common experience on behalf of the class of well-known devices while maintaining a common model for presentation of all user experiences.

At block 538, the dialog is provided (e.g., displayed) to the user, and the information provided by the user through the dialog is employed for further processing, as described with regard to FIG. 5A.

Although not depicted in FIG. 5B, in some embodiments the management component may provide an experience to the user that is a combination of the common experience and the experience specific to the second device. For example, the management component may provide a common dialog for a particular class of devices as well as a second dialog that is more specific to the second application. This second dialog may be a companion dialog that displays additional options for interacting with the second application and/or gathers information required by the second application for servicing the user's request. Such embodiments including a companion dialog are described in more detail below.

Moreover, in some embodiments the second application may be interrogated by the management component to determine any particularly required information of the second application. For example, where the second application is a front end for an online services provider (e.g., an e-business), required information may include identification and/or payment information of the user as a customer of the service provider, such as name, address, phone number, email address, credit card number, delivery/pickup information, a user's packaging preference, and the like. In some embodiments, privacy considerations may provide for a user's ability to opt in to an information sharing policy prior to sharing any personal, private, or sensitive information, or opt out of a data sharing policy to prevent sharing any such information.

Figure 5C:
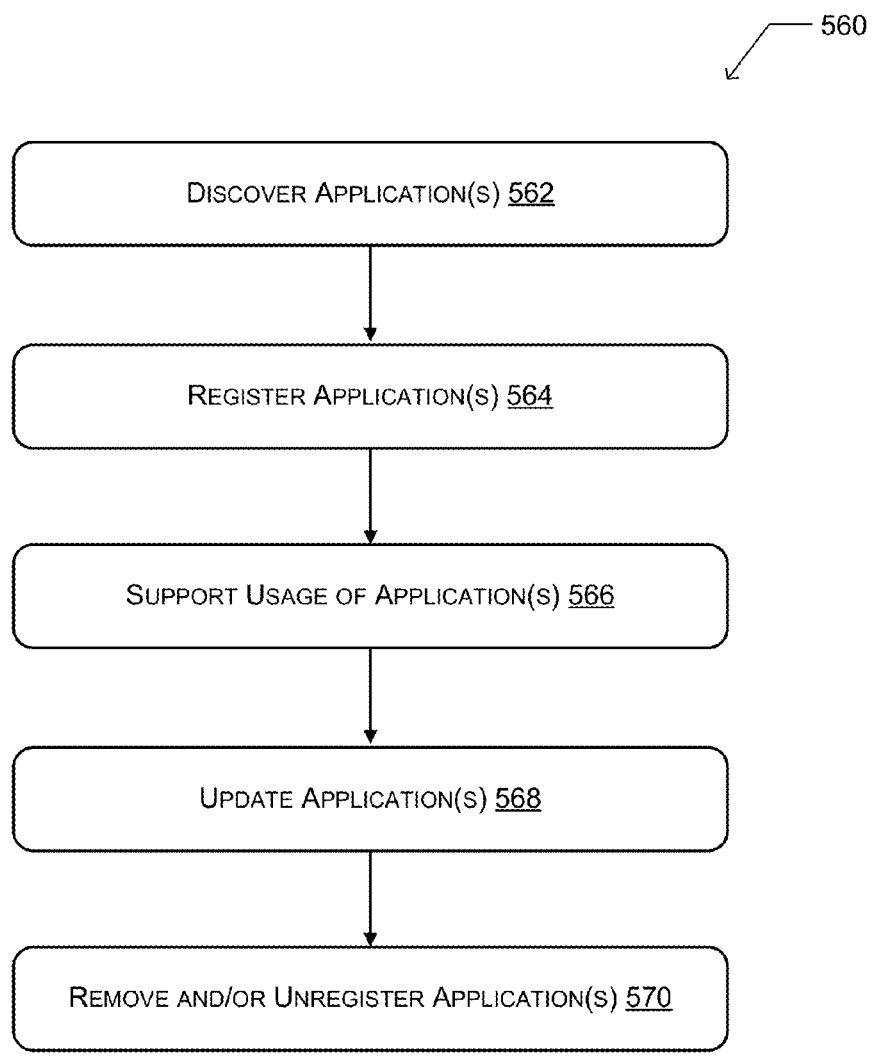
FIG. 5C depicts an illustrative process for application lifetime management, for one or more embodiments.

FIG. 5C depicts an illustrative process 560 for application lifetime management, for one or more embodiments. Such lifetime management is for one or more applications, including the applications described herein as first or second applications, that provide either a virtualization of a physical device or a front end for an online service. The operations shown in FIG. 5C are may be performed by the management component(s), or alternatively by management component(s) and other system components generally designed to support lifetime management of applications.

At step 562, process 560 discovers one or more applications to be registered with the management component, and made available to participate in a bi-direction interaction with a source application. In some embodiments this process of discovery is an active process initiated by the management component which sends a communication querying for applications that are available to register with the management component. In some embodiments, the process of discovery is passive in that the management component listens for applications that are sending communications requesting registration.

At step, 564, the one or more discovered or detected applications are registered at the management component. In some embodiments, the management component enables virtualized applications to register their ability to participate in certain data exchange scenarios with a source application. For example a virtualized application for printing may be enabled to inform the management component for printing that it is available to be used as a target for the printing functionality. Various models may be employed for registering virtualized applications with the management component for the purpose of serving as a target application in a managed data exchange. In some embodiments, registration of the virtualized application may include communicating to the management component the various capabilities and/or requirements of the virtualized application and/or the physical device or service that it virtualizes.

At step 566, the process supports the usage of the registered application(s). This usage proceeds generally as described elsewhere herein with regard to FIGS. 5-9. At step 568, the one or more registered applications may be updated. Such updates allow new and/or different functionality of the application to be communicated to the management component, so that the management component can include new options and/or requirements in the experience (e.g., dialog) provided to the user. At operation 570, one or more registered applications may be removed and/or unregistered from the management component, so that they are no longer available to participate in the bi-direction interaction mediated by the management component.

FIG. 6 is a diagram of an example configuration for mediating a bi-directional interaction between applications. FIG. 6 depicts similar elements to those of FIG. 4, and the description of FIG. 4 generally applies to FIG. 6. However, FIG. 6 differs somewhat from FIG. 4, and FIG. 6 illustrates embodiments where a first application 602 is generating data and/or content to be processed and/or consumed by the second application 604. Such a situation may apply where first application 602 is a word processing application, generating one or more documents to be printed. In such embodiments, second application 604 may be either a virtualization of a physical printer device such as second device 606, or a front end/interface for an online service provider 608 such as a print service provider.

Figure 7A:
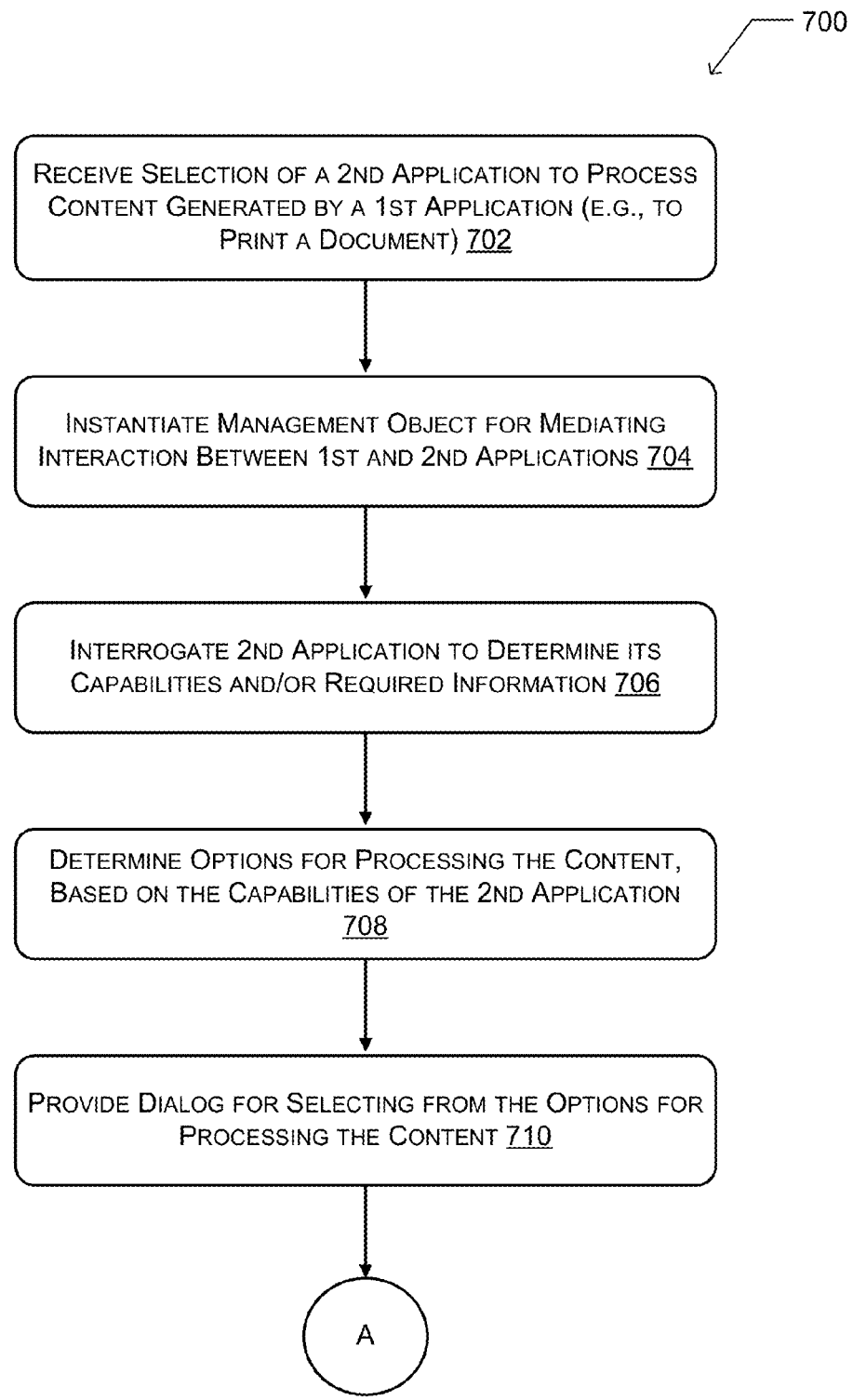
FIGS. 7A and 7B depict an illustrative process for mediating a bi-directional interaction between applications, for one or more embodiments.
Figure 7B:
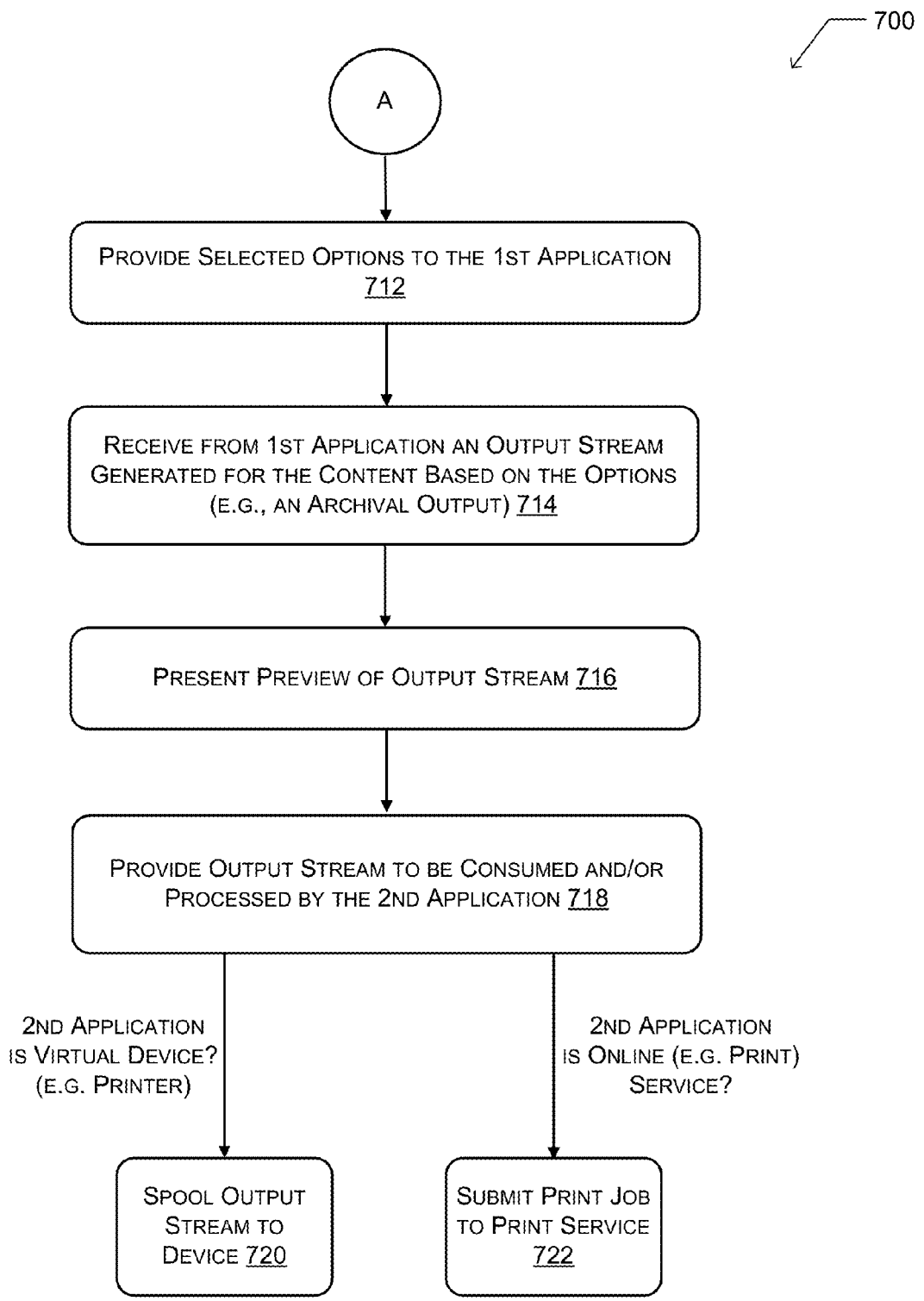

Although, the description of FIGS. 6, 7A, and 7B employs print functionality as an example, embodiments are not so limited. The embodiments support other scenarios where a user application is generating content to be consumed by a second application representing a device or service provider. For example, this scenario may support a first application that generates multimedia content, and a second application that consumes the multimedia content for processing (e.g. where service provider 608 is a video finishing and/or editing service), display (e.g., where second device 606 is a video monitor, television, recording device, and the like), or other purposes.

In another example scenario, the first application may be a mapping program that generates waypoint, route, and/or other geographical or location information to be consumed by a navigation device. As a further example, the first application may be an automation program that generates a set of instructions for managing various electronic devices in the home, office, or other setting. In this way, embodiments support virtually any scenario in which an interaction may be described as an exchange of data in a particular format between a source application and a virtualized device, thus removing a need to program directly to the device.

FIGS. 7A and 7B depict an illustrative process 700 for mediating a bi-directional interaction between two applications, according to embodiments where a first application is generating data and/or content to be consumed by a second application. In some embodiments, process 700 executes as part of management component(s) 308.

At block 702, a selection may be received, the selection indicating a second application to process and/or consume content generated by a first application. In some embodiments, the second application is selected by a user of the first application, and is made through use of a control, dialog, or other user interface element of the management component. For example, in some embodiments related to print functionality, the first application may be a word processing, image editing, or other document processing user application. The user may open a print menu or press a print button causing management component 308 to present a user experience from which the user may select the second application via a list of options for targets to print or process a document. This selection may trigger a communication to the OS and/or management component indicating the user's selection for a print target. At block 704, a management object is instantiated for mediating the interaction between the first and second applications, as described with regard to FIG. 5A.

In some embodiments, the second application is a virtualization of a target device that may process, consume, or otherwise use the content generated by the first application. For example, the second application may be a virtualization of a printing device for printing a document generated by a word processing application, or a display device, monitor, or television for displaying multimedia content generated by or streamed from the first application. In other embodiments, the second application is a front end or interface for an online service provider, e.g. a business or other entity that may provide a service by processing in some way the content generated by the first application. For example, such an online service provider may be a publishing company, printing services provider, image processing company, audio/video processing, or other entity.

At block 706, the management object and/or management component interrogates the second application to determine its capabilities and/or its requirements. Capabilities may include limitations, options or other information related to the second application's ability to process or consume the content generated at the first application. For example, where the second application virtualizes a printing device, capabilities determined may include printing capabilities of the printing device (e.g., color palettes available, two-sided printing, paper type, output size, magnification, landscape vs. portrait layout, page numbering, watermarking, and the like). As another example, where the second application virtualizes a display device or video processing device, capabilities determined may include supported audio/video formats, display size, and the like. In some embodiments, as described above with regard to FIG. 5B, the second application may be further interrogated to determine any particularly required information of the second application.

At block 708, one or more options are determined for processing the content, based on the determined capabilities and/or requirements of the second application. These options may be presented to the user as part of a dialog, at block 710. The user may employ the dialog to select one or more options for processing the content, and/or provide any information required by the second application. In some embodiments, the dialog may be common across all types of second application. In other embodiments, the dialog may be common across a particular type or types of second application (e.g., generic to applications that virtualize a printing device). The dialog is populated with options particular to the capabilities and/or requirements of the second device. As described with regard to FIG. 5B, the dialog may be part of a user experience that is either a common user experience generated by the management component or an experience more particular to the second application and generated from the second application.

In some embodiments, a second dialog may further be presented to the user at block 710. This second dialog may present to the user a second set of options for processing the content. In some embodiments, this second set of options may be particular to the second application and may be received from the second application as part of the interrogation at block 706 or as part of a separate communication between the management component or object and the second application.

In embodiments where the second application virtualizes a device, this second set of options may represent particular capabilities of the device beyond those capabilities that are common for that class of device. For example, a printer device may have many of the usual capabilities and/or options available to printers, but may have additional capabilities for the printer model and/or manufacturer, such as sharper image printer, more vivid color palettes available, and the like. The second dialog (e.g., a companion dialog) enables a particular device manufacturer to create a user experience that is particular to that device, by including in the second dialog the options particular to the device, as well as (optionally) branding, marketing and further information specific to the device model and/or manufacturer.

Such a companion dialog may also be particularly useful where the second application represents an online service provider or e-business (e.g., a print shop). In this case, the companion dialog may be configured to collect customer, payment, and any other information needed by the service provider to service the user's needs (e.g., the required information described above). The companion dialog may also display branding, marketing, contact information, and the like particular to the service provider.

In some embodiments, the dialogs described above are displayed from the management component or object running within the OS, and not from the first application. Thus, the embodiments described herein free the first application from having to provide this functionality. By providing the dialogs from the management component instead of the application, the user may be provided with a common and more feature-rich experience for interacting with devices.

Proceeding to FIG. 7B, at block 712 the selected options are provided to the first application. These options may include those options selected by the user through the first and/or second dialogs described above, and may also include one or more default options not specifically selected by the user. At block 714, an output stream is received from the first application. This output stream may be generated for the content based on those options provided to the first application at block 712. For example, in the printing scenario, the options may include those print options selected by the user. When those options are provided to the first application (e.g., a word processing application), the application may reflow the document based on the options, and generate a formalized description of each page to be printed based on the options. In some embodiments, the formalized description is in a document exchange format—a common abstract format for describing information on a page—such as Adobe® PostScript® or XML Paper Specification (XPS).

Thus, in the print example, the output stream received may be an archival output stream. However, embodiments are not limited to a particular type of stream. The received output stream may be a stream without predefined bounds, such as a video stream that is streamed so long as a camera or other device is streaming the content (e.g., a live, continuous data stream). The stream may also be a stream that is fixed with known bounds, such as a streamed data file containing textual, graphics, multimedia, or other types of data. Various formats may be supported for the output stream without departing from the spirit or scope of the embodiments described herein. Moreover, although the output stream is described as a stream for clarity, embodiments support an output stream that includes data packages or objects of various types including both a stream type and a file type.

Optionally, at block 716, a preview of the output stream may be presented to the user. In the print example, the preview may be a print preview of the output stream to be printed. Providing such a preview from the management component within the OS frees the application from having to provide such functionality, and may enable a richer, common user experience to be provided. Although not shown, the preview may also enable the user to change the selected options to alter and fine-tune the output stream prior to sending it on to the second application. In other embodiments, the responsibility for presenting the preview is left to management component but the actual generation of the content for the preview remains under the control of the application.

At block 718, the output stream is provided to the second application to be consumed, processed, or otherwise used by the second application. In embodiments where the second application is a virtualization of a device (e.g., a printer), the output stream may be spooled or otherwise provided to the device via the second application at block 720. In embodiments where the second application is a front end of an online service (e.g., a print service), the output stream is submitted to the online service (e.g., as a print job to be completed according to the user's specified options). The method for delivering the output stream to the final destination is not restricted by embodiments, and any method which transfers the contents of the output stream to the destination is supported.

In some embodiments, instead of sending the contents directly to the device, the contents are sent via a server device (e.g., a print server, in the printing scenario). Moreover, in some embodiments where the target device or service does not directly support the contents of the stream, there may be an intermediate step in which the stream is converted to a format (e.g., a PDL in the printing case) that is supported by the device. In some cases, this conversion may be performed prior to sending the stream to the device or server. In embodiments where the contents are sent to a server (e.g., print server) which then forwards the stream on to the target device, the conversion may occur after the stream is sent to the server and before it is sent to the target device. In some embodiments, the conversion is performed by a device driver (e.g., a printer driver).

FIG. 8 is a diagram of an example configuration for mediating a bi-directional interaction between applications. FIG. 8 depicts similar elements to those of FIG. 4, and the description of FIG. 4 generally applies to FIG. 8. However, FIG. 8 differs somewhat from FIG. 4, and FIG. 8 illustrates embodiments where a first application 802 is consuming data and/or content generated by the second application 804. Such a situation may apply where first application 802 is a video conferencing or video chat application, using video content generated by a second device 806 (e.g., a webcam or other video camera) and provided through second application 804 serving as a virtualization of second device 806.

Figure 9A:
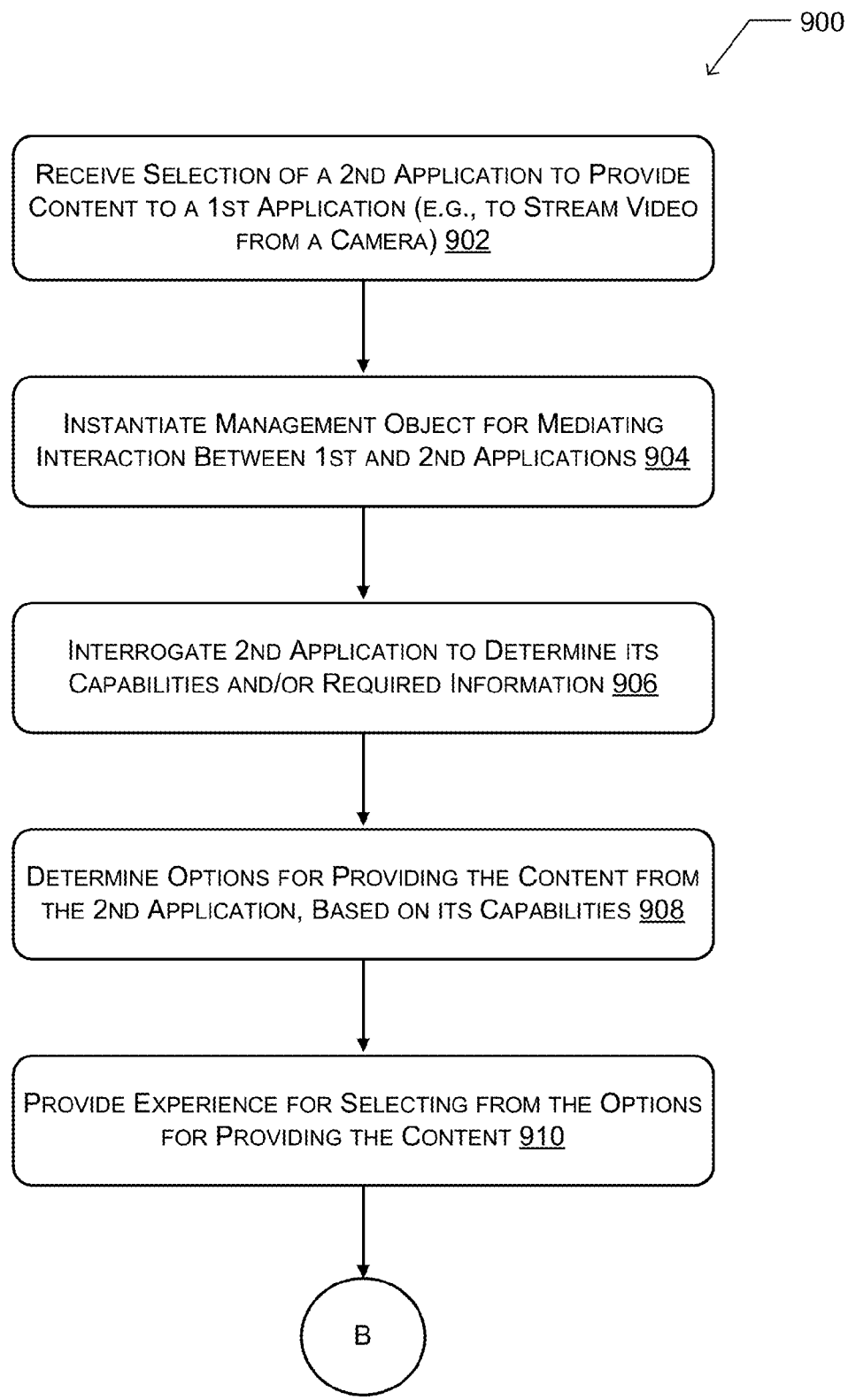
FIGS. 9A and 9B depict an illustrative process for mediating a bi-directional interaction between applications, for one or more embodiments.
Figure 9B:
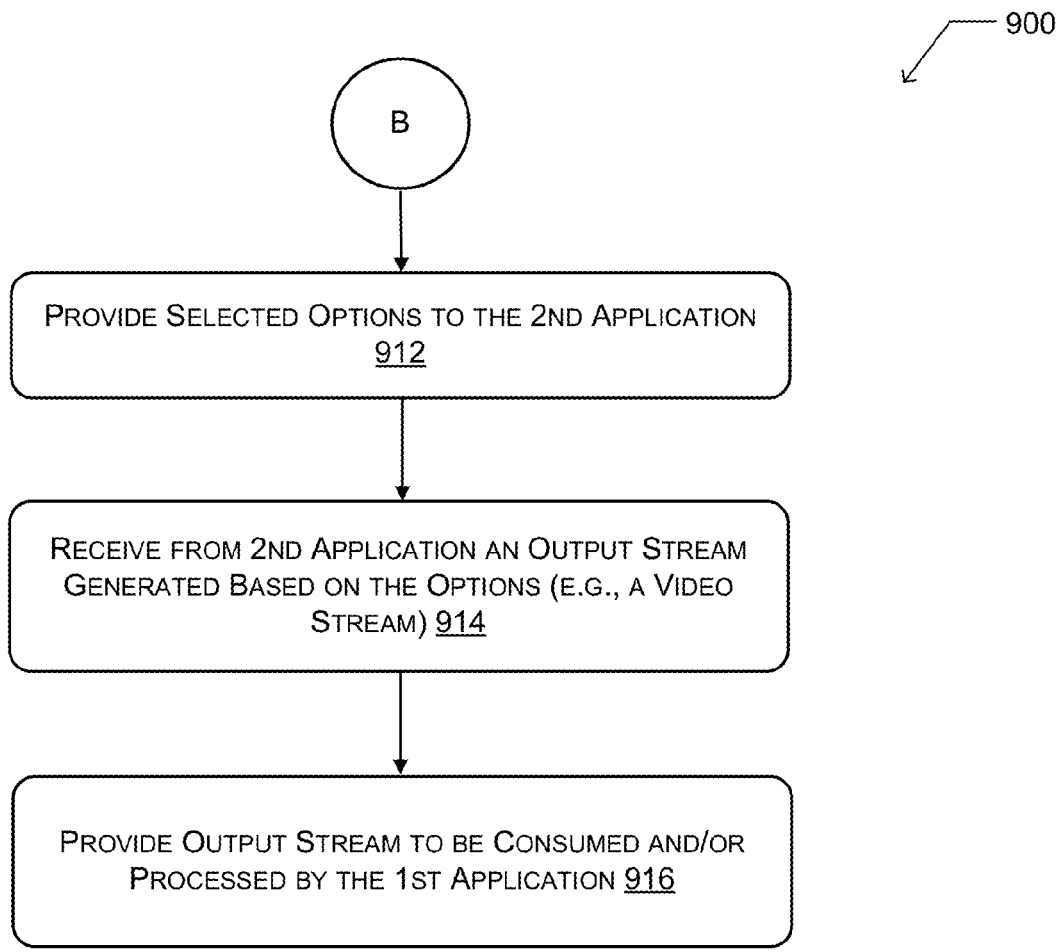

Although, the description of FIGS. 8, 9A, and 9B employs camera functionality as an example, embodiments are not so limited. Embodiments include other scenarios where a user application is consuming content generated by a second application that virtualizes a device. For example, in one scenario a fitness application may receive streamed data from a fitness device (e.g., exercise machine), biostatistics monitor (e.g., heart rate monitor), or other data. As another example, the first application may be an environmental, weather, or other monitoring program that receives real-time, semi-real-time, and/or historical data from environmental sensors that measure temperature, pressure, humidity, wind speed, airborne contaminants/particulate matter, or other data. In general, the data received and/or sent by the first application may be in the form of a real-time stream, or a stream of one or more discrete files.

FIGS. 9A and 9B depict an illustrative process 900 for mediating a bi-directional interaction between two applications, according to embodiments where a first application is consuming data generated by a second application. In some embodiments, process 900 executes as part of management component(s) 308.

At block 902, a selection may be received, the selection indicating a second application to provide content to be consumed by a first application. In some embodiments, the second application is selected by a user of the first application, and is made through use of a control, dialog, or other user interface element of the management component. For example, in embodiments related to camera, the first application may be a video chat or video conferencing application. The user may open a menu or other user interface element for selecting a source of video data to use in a conference or chat session, thus causing the management component to present a user experience for selecting the second application which may be a virtualization of a device that streams video data (e.g., a webcam or other camera). This selection may trigger a communication to the OS and/or management component indicating the user's selection for video source. At block 904, a management object is instantiated for mediating the interaction between the first and second applications, as described with regard to FIG. 5A.

At block 906, the management object and/or management component interrogates the second application to determine its capabilities and/or its requirements for providing the content. For example, where the second application virtualizes a camera device, capabilities determined may include video or audio capabilities of the camera, including but not limited to the ability to set brightness, hue, color palette, supported video formats and image sizes, ability to create effects, ability to perform facial recognition, and the like.

At block 908, one or more options are determined for providing the content, based on the determined capabilities and/or requirements of the second application. These options may be presented to the user as part of a user experience (e.g., one or more dialogs), at block 910. As discussed herein, in some embodiments the dialog may be presented from the management component. However, in other embodiments, the dialog may be presented from the second application (e.g., the virtualized application). The user may then employ the dialog to select one or more options for the second application to provide the content, and/or provide any information required by the second application. As described above, in some embodiments the dialog may be common across all types of second application. In other embodiments, the dialog may be common across a particular class or type of second application (e.g., generic to applications that virtualize a camera device). The dialog is populated with options associated with the capabilities and/or requirements of the second device.

As described with regard to FIG. 5B, the dialog may be part of a user experience that is either a common user experience generated by the management component or an experience more particular to the second application and generated from the second application. Moreover, in some embodiments a second dialog may further be presented to the user at block 910. This second dialog may present to the user a second set of options specific to the particular second application and/or the device that it may virtualize, as described above with regard to FIG. 7A.

Proceeding to FIG. 9B, at block 912 the selected options are provided to the second application. These options may include those options selected by the user through the dialog(s) described above, and may also include one or more default options not specifically selected by the user. The second application may then generate the desired content based on the options specified. At block 914, the output stream is received from the second application, and at block 916, the output stream is provided to the first application to be consumed, processed, or otherwise used by the first application. As with the previous examples, the second application may be a virtualization of a device (e.g., a camera). The second application may also be a front end/interface to an online service (e.g., a service that provides a secure video feed or other content). Embodiments may employ virtually any method and/or model for receiving the output stream.

Conclusion

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A system comprising:
one or more processors; and
a management component executed by the one or more processors and performing actions including:
determining a second application to process content generated by a first application;
interrogating the second application to determine one or more capabilities of a target device;
receiving from the first application an output stream that is generated for the content based on one or more options; and
providing the output stream to be consumed by the second application.

2. The system of claim 1, wherein the second application is a virtualization of the target device.

3. The system of claim 1, wherein the output stream is a document to be printed, wherein the second application is a virtualization of a printer device, and wherein consuming the output stream includes printing the output stream at the printer device.

4. The system of claim 1, wherein the output stream is a document to be printed, wherein the second application is a print service, and wherein consuming the output stream includes submitting the output stream in a print job request to the print service.

5. The system of claim 1, wherein the actions further include presenting a preview of the output stream prior to providing the output stream to be consumed by the second application.

6. The system of claim 1, wherein the output stream is a multimedia content stream, and wherein the second application is a virtualization of the target device capable of consuming the multimedia content stream.

7. The system of claim 1, wherein the actions further include providing an experience to enable a user to select the one or more options from one or more available options for generating the output stream, and wherein the one or more available options are based on the one or more capabilities of the second application.

8. The system of claim 7, wherein the experience is generated by the management component, and wherein the experience is common to a class of applications that includes the second application.

9. The system of claim 7, wherein the experience is generated by and specific to the second application.

10. A method implemented by a computing device, the method comprising:

at a management application executing on the computing device, receiving an indication of a second application to consume content generated by a first application;

at the management application, interrogating the second application to determine a set of options for consuming the content, based on one or more capabilities of a target device;

determining whether to provide a common experience to a user or to provide to the user an experience that is at least partially tailored to the second application, the common experience being common to a class of applications that includes the second application;

in response to determining whether to provide the common experience to the user or to provide to the user the experience that is at least partially tailored to the second application, providing a dialog from the management application to enable selection from the set of options;

providing the selected options from the management application to the first application;

at the management application, receiving from the first application a content stream generated for the content according to the selected options; and providing the content stream from the management application to the second application.

11. The method of claim 10, wherein determining whether to provide the common experience to the user or to provide to the user the experience that is at least partially tailored to the second application is based at least in part on information received during registration of the second application with the management application.

12. The method of claim 10, wherein the second application is a virtualization of the target device that consumes the content stream.

13. The method of claim 10, wherein the second application is provided by an online service provider that consumes the content stream.

14. The method of claim 10, wherein:
the second application is a virtualization of a printer device;
the content generated by the first application includes at least one document to be printed; and
the method further comprises determining that the common experience is to be provided to the user based, at least in part, on the second application being a virtualization of the printer device.

15. The method of claim 10, wherein:
the second application is a virtualization of a display device;
the content generated by the first application includes video content;
the set of options includes options for at least one of displaying the video content or processing the video content; and
the content stream is a video stream to be displayed on the display device.

16. The method of claim 10, wherein:
the second application is a virtualization of a print service;
the content generated by the first application includes at least one document to be printed; and
the method further comprising determining that the experience that is at least partially tailored to the second application is to be provided to the user based, at least in part, on the second application being a virtualization of the print service.

17. One or more computer readable storage media storing instructions that direct a computing device to perform actions comprising:
instantiating an instance of a management object for mediating an interaction between a first application and a second application, based on a selection of the second application;
from the management object, determining one or more capabilities of a target device based, at least in part, on communications with the second application;
from the management object, providing an experience for selecting from a set of options for the interaction, wherein the set of options are generated based on the one or more capabilities of the second application; and
initiating the interaction between the first application and the second application, according to the selected options.

18. The one or more computer readable storage media of claim 17, wherein the actions further comprise:
saving the instance of the management object after a first interaction between the first application and the second application ends; and
instantiating the instance of the management object in response to a second interaction between the first application and the second application, the second interaction being subsequent to the first interaction.

19. The one or more computer readable storage media of claim 17, wherein the second application is a virtualization of a camera device.

20. The one or more computer readable storage media of claim 17, wherein the second application is a virtualization of a camera device, and wherein the interaction includes the first application receiving image data generated by the camera device.

* * * * *